United States Patent [19]
Cosgrove et al.

[11] Patent Number: 5,644,647
[45] Date of Patent: Jul. 1, 1997

[54] USER-INTERACTIVE REDUCTION OF SCENE BALANCE FAILURES

[75] Inventors: Patrick Andre Cosgrove; Robert Melvin Goodwin, both of Rochester; Heemin Kwon, Pittsford; Anthony Scalise, Fairport, all of N.Y.

[73] Assignee: Eastman Kodak Company, Rochester, N.Y.

[21] Appl. No.: 583,740

[22] Filed: Sep. 17, 1990

[51] Int. Cl.$^6$ .................................................... G06K 9/40
[52] U.S. Cl. ............................................. 382/162; 382/275
[58] Field of Search ........................... 382/1, 54, 18; 358/78, 80; 356/406; 355/40, 77

[56] References Cited

U.S. PATENT DOCUMENTS

| | | | |
|---|---|---|---|
| 4,642,684 | 2/1987 | Alkofer | 358/80 |
| 4,668,082 | 5/1987 | Terashita et al. | 355/77 |
| 4,769,695 | 9/1988 | Terashita | 358/76 |
| 4,899,212 | 2/1990 | Kaneko et al. | 358/29 |
| 4,953,227 | 8/1990 | Katsuma et al. | 382/18 |
| 4,979,031 | 12/1990 | Tsuboi et al. | 358/75 |

*Primary Examiner*—Leo Boudreau
*Assistant Examiner*—Chris Kelley
*Attorney, Agent, or Firm*—Charles E. Wands

[57] ABSTRACT

A photofinishing image processing operator detects failures in the performance of a scene balance mechanism on a digitized image and enables a photofinisher to interactively correct for such failures before the failed image has been processed and an unacceptable output image printed. Whenever a failed image is identified, one or more reasonably low resolution versions of the image as processed by the scene balance mechanism are displayed to the photofinishing operator, together with a request for image adjustment information that is used to modify or correct the color balance of the image. In response to this user input information, the image processor adjusts color balance parameters of the scene balance mechanism, so that the digitized image processed by the modified scene balance mechanism will yield a print of acceptable color balance quality. This interaction of the photofinishing operator with the image processing system may be accomplished by way of several modes, including displaying differently processed versions of the image, or a single version of the image processed by the scene balance mechanism, together with a question regarding the type of image. The failure detection mechanism preferably employs a non-linear discriminator, such as a neural network.

26 Claims, 4 Drawing Sheets

FIG. 6

USER-INTERACTIVE REDUCTION OF SCENE BALANCE FAILURES

FIELD OF THE INVENTION

The present invention relates in general to digitized color imagery photofinishing systems and is particularly directed to a mechanism for detecting failures in the performance of an image adjustment (e.g. scene balance) mechanism and, in response to a detected potential failure, interactively adjusting color balance control parameters of the image adjustment mechanism, so as to enable that digitized color image to be modified or corrected (e.g. color balanced) in a manner that will produce a representation that is pleasing to the human visual system.

BACKGROUND OF THE INVENTION

Optical photofinishing systems customarily employ some form of image correction or adjustment mechanism, such as a scene balance mechanism, which evaluates the content of each digitized image and selectively adjusts or modifies the image, for example adjusts its color balance, so that, when reproduced, as by way of an optical printer, the printed image will be a high quality color reproduction that is pleasing to the human visual system. For purposes of the present invention, by 'scene balance mechanism' is meant an adjustment of image color balance based upon the scene content and the sensitometric characteristics (e.g. exposure, light source, etc.) of the image being reproduced. Adjustment of 'color balance' is defined as adjusting the average red, green and blue image levels, so as to ensure that an image will have the appropriate color and neutral reproduction characteristics.

Unfortunately, because such image adjustment mechanisms are typically statistically based, some images will be unsuccessfully treated and, consequently, will yield an unacceptable reproduction. Moreover, depending upon the particular image correction mechanism employed, the rate at which images are unsuccessfully processed can be significant (e.g. on the order of five percent). In those instances where the correction mechanism fails to properly correct the image (e.g. adjust its color balance), either the customer receives a poor quality print or the photofinisher discovers the mistake and then manually corrects the image. In either case (in response to a disgruntled customer or a predelivery intercept during a photofinisher's review), because the error is not corrected until after the image is printed, the photofinisher incurs a substantial cost in materials (the print paper being a major portion of the cost of film processing) and time (due to the break in the flow of the image reproduction process).

SUMMARY OF THE INVENTION

In accordance with the present invention, rather than simply tolerate a failure in the performance of the image correction mechanism and manually correct the improperly processed image after an unacceptable print has been discovered, an image adjustment failure detection mechanism is inserted into the photofinishing process upstream of the reproduction (printing) stage, in order to identify those images where the image correction mechanism is likely to fail. Once such a 'likely to fail' image is identified, one or more reasonably low resolution versions of the digitized image, produced as a result of modifications or parameter corrections of the adjustment mechanism, are displayed to the photofinisher, together with a request for the photofinisher to input image adjustment information that is used to modify or correct (the color balance of) the image. In response to this user input information, the image processor adjusts parameters of the image correction mechanism, so that the digitized image processed by the selected (modified) image adjustment mechanism will yield a reproduction (print) of acceptable color balance quality. This interaction of the photofinishing operator with the image processing system may entail several modes. Where the image adjustment mechanism is a scene balance mechanism for balancing the color content of the image, each mode serves to modify control parameters of the scene balance operation.

In accordance with a first mode, plural, low resolution versions of the processed image of acceptable presentation quality are displayed on the photofinisher's workstation display. One of these image versions (e.g. one that has been centrally placed within an array of images across the display) shows how the digitized image would appear based upon the current response of the image adjustment (scene balance) mechanism. Displayed versions of the image on opposite sides of this one image show variations in color balance resulting from iteratively shifted parameter adjustments to the (scene balance) mechanism (e.g. lighter and darker where the failure mode detected is one of neutral balance). By way of a display prompt, the photofinisher is requested to choose from among the different displayed versions of the image the one that is most pleasing. In response to this selection, the manner in which the scene balance mechanism processes the digitized image is modified to conform with the color balance characteristics of the selected image version.

Pursuant to a second mode of operation, which is similar to the first mode, the user is given a choice of only two versions of the image—the one currently produced by the scene balance mechanism and an alternative that is based upon a set of modified parameters. As in the first mode, the digitized image is then processed to conform with the color balance characteristics of the selected image version, indicating one of two possible scene interpretations, such as flash vs. non-flash or color-subject failure vs. non-subject failure.

In accordance with a third mode of operation, a low resolution version of the image processed by the scene balance mechanism is displayed to the photofinishing operator, together with a question regarding the type of image, e.g. whether or not the image is a backlit scene or a flash scene, which may seem similar to the scene balance mechanism but requires different balance processing. The photofinisher's response is then employed to refine how the scene balance mechanism corrects the image (e.g. corrects for an illumination ambiguity).

The mechanism for detecting failures in the performance of the scene balance mechanism may comprise a statistically based, linear discriminator, such as a Fischer Discriminant or a Bayes Classifier, which employ a multidimensional discrimination space derived from predictors computed from the imagery data. Preferably, however, the failure detection mechanism employs a nonlinear discriminator, such as a back propagation-trained neural network, because of its ability to accurately recognize images that the scene balance mechanism will correctly process. Typically, both linear discriminators and neural networks will detect potential color balance failures for about 50% of poor quality images; however, the preferred neural network-based failure discriminator will effectively never detect a potential failure for a correctly color-balanced image.

DETAILED DESCRIPTION

Before describing in detail the image adjustment failure discrimination mechanism in accordance with the present invention, it should be observed that the present invention resides primarily in a novel structural combination of conventional digital imagery processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 1:
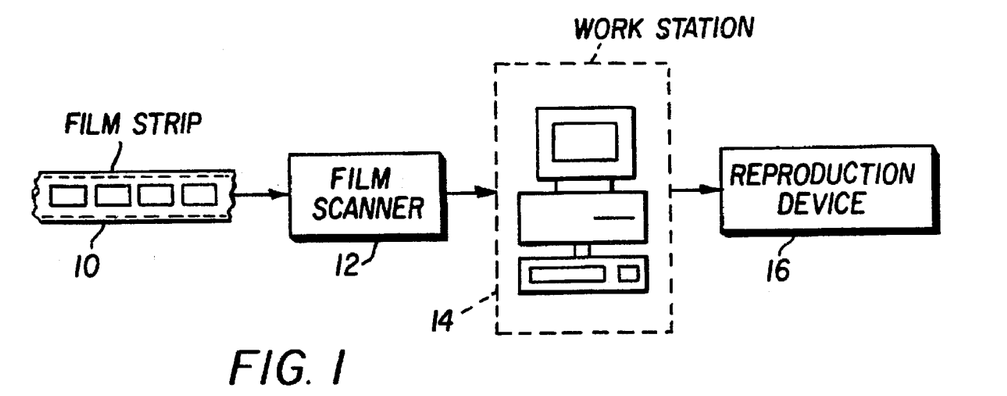
FIG. 1 diagrammatically illustrates a photographic color film photofinishing minilab with which the image adjustment (e.g. scene balance) failure detection and correction mechanism of the present invention may be employed.

FIG. 1 diagrammatically illustrates a photographic color film processing system (e.g. photofinishing minilab) with which the image adjustment failure discriminator in accordance with the present invention may be employed and, for purposes of the present description, such a system may be of the type described in co-pending patent application Ser. No. 582,305, filed Sep. 14, 1990—U.S. Pat. No. 5,218,455, by S. Kristy, entitled "Multi-resolution Digital Imagery Photofinishing System", assigned to the assignee of the present application and the disclosure of which is incorporated herein. It should be observed, however, that the system described in the above-referenced co-pending Kristy application is merely an example of one type of system in which the invention may be used and is not to be considered limitative of the invention. In general, the invention may be incorporated in any digitized imagery processing and reproduction system. Moreover, although, in the description to follow, the failure discriminator will be described in terms of the operation of a scene balance mechanism, it should be observed that the principles presented here are applicable to other image adjustment schemes.

In accordance with the digital image processing system of FIG. 1, photographic color images, such as a set of twenty-four or thirty-six 36 mm-by-24 mm image frames of a 35 mm film strip 10, are scanned by a high resolution opto-electronic color film scanner 12, such as a commercially available Eikonix Model 1435 scanner. High resolution film scanner 12 outputs digitally encoded data representative of the response of its imaging sensor pixel array (e.g. a 3072× 2048 pixel matrix) onto which a respective photographic image frame of film strip 10 has been projected by an input imaging lens system. This digitally encoded data, or 'digitized' image, is encoded to some prescribed resolution (e.g. 16 bits per color per pixel) that encompasses a range of values over which the contents of the scene on the color film may vary. For a typical color photographic negative, the range of values is less than the density vs. exposure latitude of the film, but is sufficiently wide to encompass those density values that can be expected to be encountered for a particular scene. Then, by means of a scene balancing mechanism resident in an attendant image processing workstation 14, which contains a frame store and image processing application software through which the digitized image may be processed to achieve a desired base image appearance and configuration, the digitized image is mapped into a set of lower bit resolution digital codes (e.g. 8 bits per color per pixel), each of which has a resolution corresponding to the dynamic range of a digitized image data base (e.g. frame store), the contents of which may be adjusted in the course of driving a reproduction device 16, for example, enabling a print engine to output a high quality color print.

Preferably, the digitized imagery data output by the high resolution film scanner is subjected to a code conversion mechanism of the type described in co-pending application Ser. No. 582,306, filed Sep. 14, 1990, by Y. Madden et al, entitled "Extending Dynamic Range of Stored Image Database," assigned to the assignee of the present application and the disclosure of which is herein incorporated. Pursuant to this code conversion scheme, the dynamic range of the digitized image database is extended so as to permit shifting of encoded pixel values without 'clipping', and to provide a limited window of values into which extremely high reflectance image points may be encoded and stored. Digital codes into which the image scanner output are mapped by the scene balance mechanism are converted into a set of reduced-range digital codes of the same resolution as, but having a smaller range of image content values than the dynamic range of the digitized image data base. The code conversion mechanism operates to convert a maximum value of 100% white reflectance to an encoded value that is less than the upper limit of the dynamic range of the database to accommodate shifts in the digitized imagery data and allow for the placement of specular highlights that are beyond the 100% white reflectance maximum.

In accordance with the imagery data processing system described in the above referenced co-pending Kristy application, each high resolution captured image is stored as a respective image data file containing a low, or base, resolution image bit map file and a plurality of higher resolution residual images associated with respectively increasing degrees of image resolution. By iteratively combining these higher resolution residual images with the base resolution image, successively increased resolution images may be recovered from the base resolution image.

As an example, spatial data values representative of a high resolution (3072×2048) image scan of a 36 mm-by-24 mm image frame of a 35 mm film strip 10 may be stored as a respective image data file including a base resolution image bit map file containing data values associated with a spatial image array or matrix of 512 rows and 768 columns of pixels and an associated set of residual image files to be stored on the disc. Within the workstation itself, the base resolution image may be further subsampled to derive an even lower resolution sub-array of image values (e.g. on the order of 128×192 pixels) for use by the photofinishing operator in the course of formatting and storing a digitized image file.

Pursuant to the present invention, a substantially reduced resolution version of each digitized image to be color balance-processed by the scene balance mechanism is also coupled to a scene balance failure discriminator, which determines the likelihood that the output image processed by the scene balance mechanism will be of acceptable color balance quality. For this purpose, the scene balance mechanism failure discriminator examines the spatial content of a very small sub-array (e.g. 24×36 pixels) produced by sub-sampling compression of a 128×192 pixel version of the image of interest and, based upon a previously generated statistical model of prescribed characteristics of the image, derives a measure of the likelihood that the color balance performance of the scene balance mechanism for that image will produce a visually acceptable reproduction (high resolution output print).

The discriminator, per se, may comprise a statistically based, linear discriminator, such as a Fischer Discriminant or a Bayes Classifier, which use a multidimensional discrimination space derived from predictors computed from the imagery data. Preferably, however, the failure detection mechanism employs a nonlinear discriminator, such as a back propagation-trained neural network, because of its ability to accurately recognize images that will be correctly processed by the scene balance mechanism. Namely, although both linear discriminators and neural networks are capable of detecting color balance failures for about 50% of the images that will fail ('bad' images), a linear discriminator will also erroneously flag failures for some images that will be correctly processed by the scene balance mechanism. On the other hand, the preferred neural network-based failure discriminator will effectively never detect a scene balance failure for a 'good' image.

The substantially reduced resolution version of the image, such as one comprising a pixel sub-array in the order of only 24×36 pixels, contains sufficient spatial color content to permit identification of scene balance failures for a high resolution image, but with considerably reduced computational intensity. Still, even with such a reduced image size, the number of values (864 for a 24×36 pixel sub-array) that enter into the statistical analysis is substantial and, for a linear discriminator, may have an associated set of approximately 50 statistical measures (predictors) of the content of the scene. For the same sized image sub-array, it is possible to build a back propagation neural network that operates on a reasonably constrained set of parameters.

Figure 2:
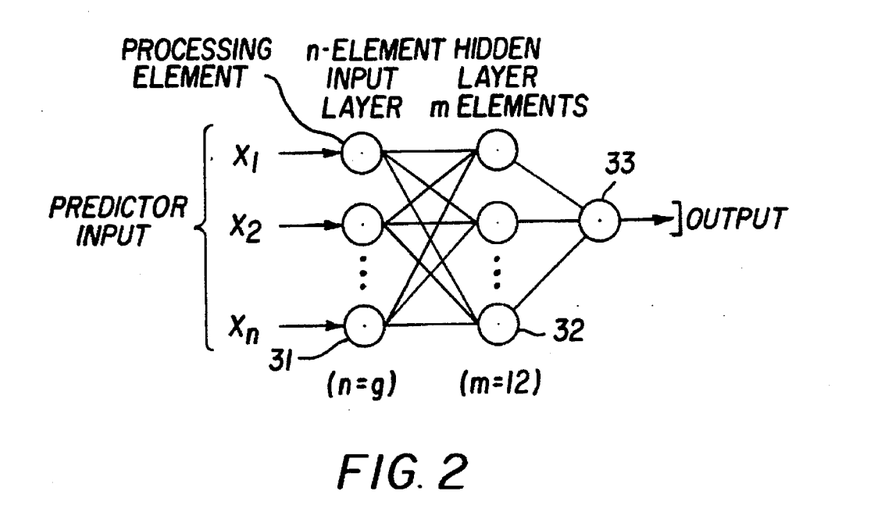
FIG. 2 diagrammatically shows an example of a neural network-configured scene balance failure discriminator containing a feed-forward n-layer perceptron (trained by back propagation)

As one non-limitative example, a neural network, such as that diagrammatically shown in FIG. 2 as a feed-forward n-layer perceptron (trained by back propagation), may be configured of a nine element input layer 31, a twelve element hidden layer and a single element output layer 33. An image training population on the order of several thousand 24×36 pixel scenes repeatedly and successively applied to the network may be used to load the network. As a non-limitative example, a set of nine predictors (Nos. 1–9) listed in Table 1, below and referencing the region map of FIG. 6, may be employed. It should be observed, however, that other predictors in addition to and different from those listed here, may be used. For a discussion of the use of neural networks for pattern recognition and choosing predictors, attention may be directed to the text: "Adaptive Pattern Recognition and Neural Networks", by Yoh-Haw Pao, Chapters 1, 2 and 5.

TABLE 1

Figure 6:
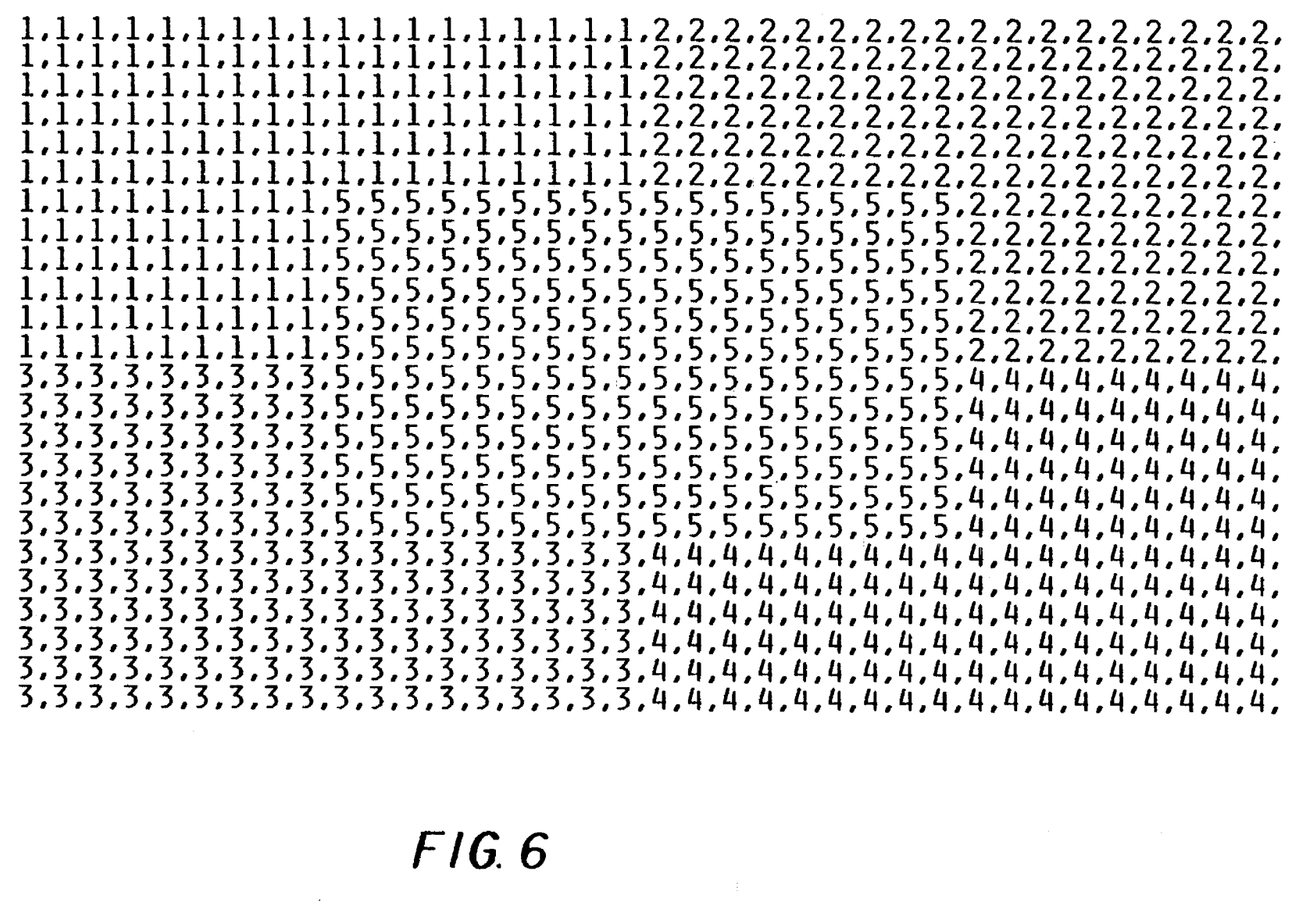
FIG. 6 diagrammatically illustrates a multiregion map used to define the characteristics of a scene balance failure discriminator.

| PREDICTOR | DEFINITION |
|---|---|
| No. 1 | Red maximum of region 5 - red average of entire frame. |
| No. 2 | Red maximums of regions 3, 4, 5 are averaged together and the red average of the entire frame is subtracted from it. |
| No. 3 | Variance of neutral T space value for entire range, where T space is defined, for example, as set forth in U.S. Pat. Nos. 4,159,174 and 4,933,709). |
| No. 4 | Neutral T space average of entire frame. |
| No. 5 | Hyperbolic tangent of center maximum, minus the center average. |
| No. 6 | Neutral T space average of region 5 minus neutral T space average of regions 1, 2, 3, 4. |
| NO. 7 | Average of neutral T space maximums of regions 3, 4, 5 minus neutral T space average of entire frame. |
| No. 8 | Neutral T space centroid of entire frame. |
| No. 9 | Green magenta average of entire frame. |

Moreover, the type of neural network employed is not constrained to a feed-forward, back propagation implementation. Other network types, such as a counter propagation network may be used. Suffice it to say that examples given here have been shown to correctly identify scene balance failures for approximately 50% of 'bad' images (images for which the scene balance mechanism will fail) but 0% of 'good' images, namely those images for which the scene balance mechanism will produce a properly color-balanced output image. For a further discussion of neural networks in general and their application to statistical processing, attention may be directed to the text: "Parallel Distributed Processing" Vol. I–II, by McClelland, Rumelhart and PDP Research Group, MIT Press, 1988.

The scene balance failure detection mechanism of the present invention is preferably incorporated within the image processing software employed by workstation 14, in order that those images where the scene balance mechanism is likely to fail will be identified and corrected prior to the reproduction (printing) stage of the photofinishing process. Once such a scene balance failure image is identified, one or more reasonably low resolution versions of the digitized image processed by the scene balance mechanism are displayed to the photofinishing operator, together with a request for the photofinishing operator to input image adjustment information that is used to modify or correct the color balance action of the scene balance mechanism on that image. In response to this user input information, the image processor adjusts color balance parameters of the scene balance mechanism, so that the resulting processed image will produce a print of acceptable color balance quality. This interaction of the photofinishing operator with the image processing system may be accomplished using any one of several modes diagrammatically illustrated in FIGS. 3–5, described below.

Figure 3:
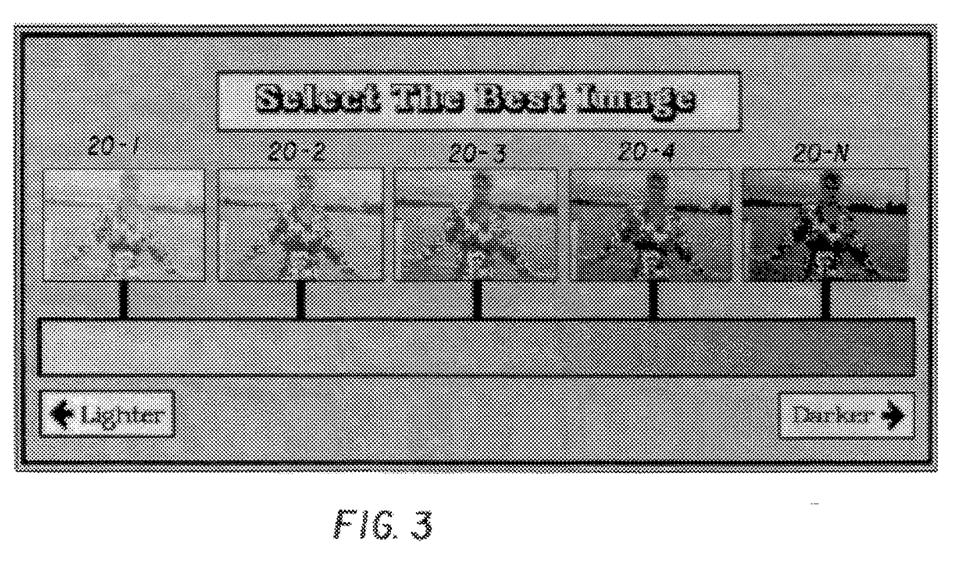
FIG. 3 illustrates a first 'sliding scale' mode of the failure detection and interactive correction process according to the present invention.

More particularly, FIG. 3 illustrates a first mode of the failure detection and interactive correction process according to the present invention in which a plurality of low resolution (128×192 pixels) images 20-1, 20-2, 20-3, . . . , 20-N, each of which is a respectively different version of the (128×192) digitized image as processed by the resident scene balance mechanism, are displayed as a linear array on the photofinisher's workstation display. The image that results from the application of the currently defined scene balance mechanism to the scanned image may correspond to image 20-3, centrally placed within a linear array of images across the workstation display screen. Images 20-1, 20-2 and images 20-4 and 20-5 on opposite sides of this image have respectively different variations in color balance obtained by successively offsetting or shifting the scene balance mechanism along a prescribed axis (e.g. lighter and darker scan densities where the failure mode detected is one of neutral balance). Further variations in the image may be formed by the use of a conventional graphics processing scrolling operator to effectively create a 'sliding scale' for a linear array of images that may be panned across the screen.

By way of a display prompt, the photofinishing operator is requested to choose the most visually pleasing one of the different versions of the image within the display window associated with respectively different biasing of the scene balance mechanism. In response to this selection, the manner in which the scene balance mechanism processes the digitized image is modified to conform with the color balance characteristics of the selected image version. For this purpose, the bias settings employed to produce the selected image are used to modify the scene balance mechanism. Namely, since each image version represents a prescribed offset or shift of the scene balance mechanism, selecting a given image effectively specifies the magnitude of the offset bias to be used by the scene balance mechanism in processing the high resolution image for storage and subsequent reproduction.

Figure 4:
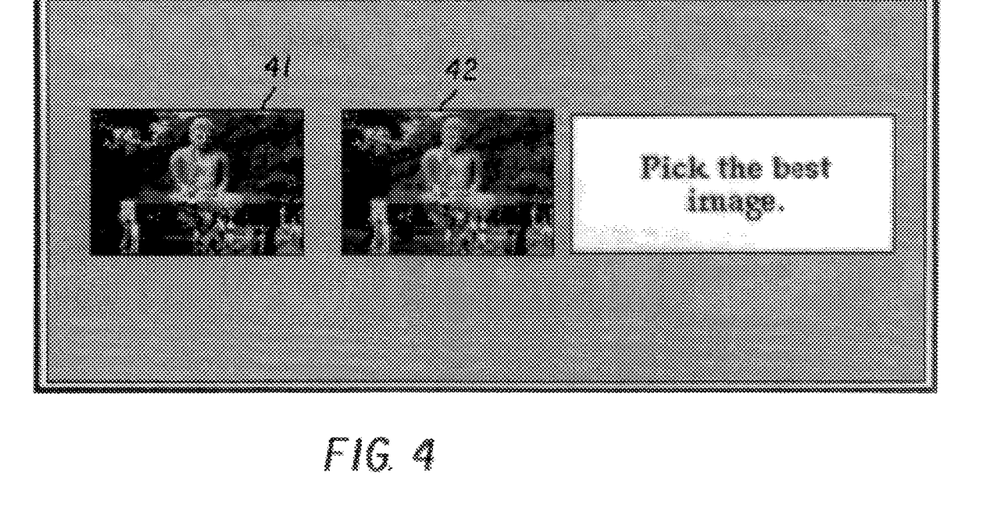
FIG. 4 illustrates a second mode of the failure detection and interactive correction process according to the present invention in which a photofinishing minilab operator is given a choice of two differently scene balance processed versions of an image.

FIG. 4 illustrates a second mode of the failure detection and interactive correction process according to the present invention in which the photofinishing minilab operator is given a choice of only two versions of the image. As shown in the figure, on the workstation display two low resolution images 41 and 42, each of which is a respectively different version of the (128×192) digitized image as processed by the resident scene balance mechanism, are displayed on the photofinisher's workstation display. One of the displayed images has been processed as though the image is front-lit (e.g. by a flash illumination source), while the other displayed image has been processed as though the image is back-lit (silhouette). Both types of images look similar to the scene balance mechanism, but require different processing. The photofinisher's choice of which displayed version of the image is most pleasing determines which version of the scene balance mechanism will be used to process that image.

Figure 5:
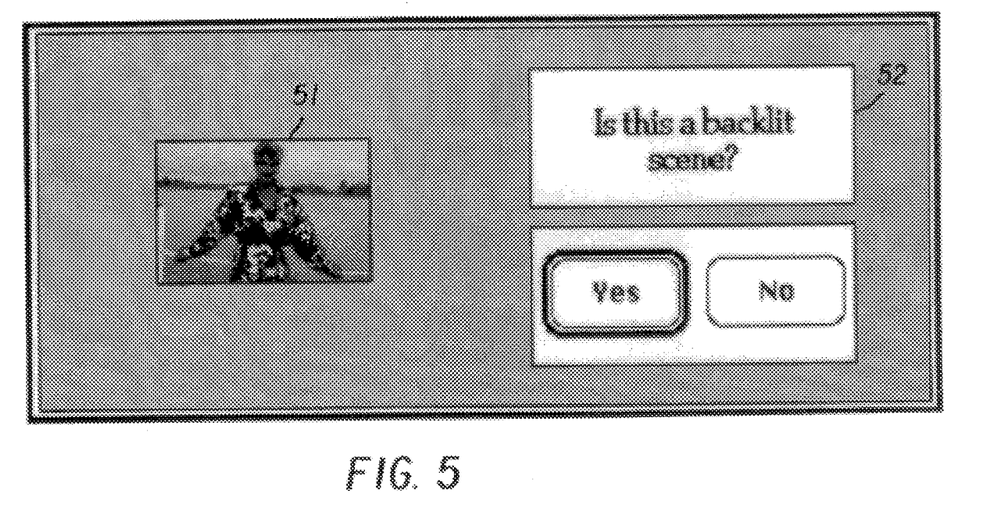
FIG. 5 diagrammatically illustrates a third mode of operation of the scene balance failure discriminator, wherein a low resolution version of the image processed by the scene balance mechanism is displayed to the photofinishing operator, together with a question regarding the type of image.

FIG. 5 diagrammatically illustrates a third mode of operation of the scene balance failure discriminator, wherein a low resolution version 51 of the image processed by the scene balance mechanism is displayed to the photofinishing operator, together with a panel 52 containing a question regarding the type of image, e.g. whether or not the image is backlit or a flash scene. The photofinisher's input response to the displayed question panel 52 (e.g. by mouse or keyboard entry) is then employed by the image processing software to refine how the scene balance mechanism corrects the image (e.g. corrects for an ambiguity in the type of scene illumination). For example, for the case where the photofinisher enters the fact that the subject/scene is backlit, a scene balance mechanism optimized for a silhouette is employed. Similarly, for the case where the photofinisher enters the fact that the subject/scene is illuminated by a flash source, a scene balance mechanism optimized for a front-lit image is used.

As will be appreciated from the foregoing description, the present invention provides a technique for detecting images prone to scene balance failures and enabling the photofinisher to interactively correct for failures in the performance of the scene balance mechanism before an image has been processed and an unacceptable output image printed. By correcting for a discovered scene balance failure prior to printing the image, the photofinisher will not incur what can amount to substantial penalties in terms of cost of materials and film processing time. Moreover, the present invention offers the advantage that, by using a failure discriminator, only some, but not all, of the scenes need to by evaluated by the photofinisher. Without it, to detect as many failures as possible, the photofinisher would have to look at every image.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

(a) processing said digitized image in accordance with an image adjustment failure discriminator to define the likelihood of whether or not said image adjustment mechanism will cause said output image to be reproduced as a prescribed quality image; and (b) in response to a prescribed likelihood that said image adjustment mechanism will fail to cause said output image to be reproduced as said prescribed quality image, generating a request for user-sourced control information for modifying the manner in which said image adjustment mechanism processes said image.

2. A method according to claim 1, wherein step (b) comprises, in response to a prescribed likelihood that said image adjustment mechanism will fail to cause said image to be reproduced as said prescribed quality image, displaying an image representative of the effect of the processing of said image by said image adjustment mechanism and generating a request for user-sourced control information for controllably modifying the manner in which said image adjustment mechanism processes said image.

3. A method according to claim 1, wherein step (b) comprises, in response to a prescribed likelihood that said image adjustment mechanism will fail to cause said image to be reproduced as said prescribed quality image, displaying a plurality of images representative of the effects of different processing of said image by modified versions of said image adjustment mechanism and generating a request for a user-sourced selection of one of said displayed images, in response to which said image adjustment mechanism is controllably adjusted to process said image as an acceptable quality output image for reproduction.

4. A method according to claim 1, wherein said image adjustment mechanism comprises a scene balance mechanism which processes a digitized image to derive a color content-balanced output image.

5. A method according to claim 1, wherein said image adjustment mechanism failure discriminator is implemented as a statistical linear discriminator.

6. A method according to claim 1, wherein said image adjustment mechanism failure discriminator is implemented as a non-linear discriminator.

7. A method according to claim 1, wherein said image adjustment mechanism failure discriminator is implemented as a neural network.

8. A method according to claim 7, wherein said neural network is a back propagation-trained neural network.

9. A method according to claim 1, wherein step (b) comprises displaying an image representative of the effect of processing said digitized image by said image adjustment mechanism and generating a request for the inputting of information representative of a characteristic of said image, in response to which said image adjustment mechanism is controllably adjusted to process said image as an acceptable quality output image for reproduction.

10. A method according to claim 1, wherein step (a) comprises coupling a reduced resolution version of said digitized image to said image adjustment mechanism failure discriminator in order to define the likelihood of whether or not said image adjustment mechanism will cause said output image to be reproduced as a prescribed quality image.

11. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the step of:

(a) prior to reproducing said image, processing said digitized image in accordance with an image adjustment failure discriminator to define the likelihood of whether or not said image adjustment mechanism will cause said output image to be reproduced as a prescribed quality image.

12. A method according to claim 11, further including the step of:

(b) in response to said image adjustment failure discriminator indicating a prescribed likelihood that said image adjustment mechanism will fail to cause said output image to be reproduced as said prescribed quality image, modifying said image adjustment mechanism.

13. A method according to claim 12, wherein step (b) comprises, in response to said image adjustment failure discriminator indicating a prescribed likelihood that said image adjustment mechanism will fail to cause said image to be reproduced as said prescribed quality image, displaying an image representative of the effect of the processing of said digitized image by said image adjustment mechanism and generating a request for control information for controllably modifying the manner in which said image adjustment mechanism processes said digitized image.

14. A method according t claim 12, wherein step (b) comprises, in response to said image adjustment failure discriminator indicating a prescribed likelihood that said image adjustment mechanism will fail to cause said image to be reproduced as said prescribed quality image, displaying a plurality of images representative of the effects of different processing of said digitized image by modified versions of said image adjustment mechanism and generating a request for a selection of one of said displayed images, in response to which said image adjustment mechanism is controllably adjusted to process said image as an acceptable quality output image for reproduction.

15. A method according to claim 11, wherein said image adjustment mechanism comprises a scene balance mechanism which processes an image to derive a color content-balanced output image.

16. A method according to claim 11, wherein said image adjustment mechanism failure discriminator is implemented as a statistical linear discriminator.

17. A method according to claim 11, wherein said image adjustment mechanism failure discriminator is implemented as a non-linear discriminator.

18. A method according to claim 15, wherein step (a) comprises coupling the contents of said digitized image to a neural network-implemented scene balance mechanism failure discriminator.

19. A method according to claim 18, wherein said neural network is a back propagation-trained neural network.

20. A method according to claim 11, wherein step (b) comprises displaying an image representative of the effect of processing said digitized image by said image adjustment mechanism and generating a request for the inputting of information representative of a characteristic of said image, in response to which said image adjustment mechanism is controllably adjusted to process said image as an acceptable quality output image for reproduction.

21. A method according to claim 11, wherein step (a) comprises coupling a reduced resolution version of said digitized image to said image adjustment mechanism failure discriminator in order to define the likelihood of whether or not said image adjustment mechanism will cause said output image to be reproduced as a prescribed quality image.

22. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

a) processing said digitized image in accordance with a statistical linear image adjustment failure discriminator to define the likelihood of whether or not said statistical linear image adjustment failure discriminator will cause said modified output image to be reproduced by said image reproduction device as a prescribed quality image; and b) displaying an image representative of the effect of the processing of said digitized image by said image adjustment mechanism and generating a request for control information for controllably modifying the manner in which said image adjustment mechanism processes said digitized image, and wherein said step comprises displaying a plurality of images representative of the effects of different processing of said digitized image by modified versions of said image adjustment mechanism and generating a request for a selection of one of said displayed images, in response to which said image adjustment mechanism is controllably adjusted to process said image as an acceptable quality output image for reproduction.

23. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

a) processing said digitized image in accordance with a non-linear image adjustment failure discriminator to define the likelihood of whether or not said non-linear image adjustment failure discriminator will cause said modified output image to be reproduced by said image reproduction device as a prescribed quality image; and     b) displaying an image representative of the effect of the processing of said digitized image by said image adjustment mechanism and generating a request for control information for controllably modifying the manner in which said image adjustment mechanism processes said digitized image, and wherein said step comprises displaying a plurality of images representative of the effects of different processing of said digitized image by modified versions of said image adjustment mechanism and generating a request for a selection of one of said displayed images, in response to which said image adjustment mechanism is controllably adjusted to process said image as an acceptable quality output image for reproduction.

24. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

a) processing said digitized image in accordance with a neural network image adjustment failure discriminator to define the likelihood of whether or not said neural network image adjustment failure discriminator will cause said modified output image to be reproduced by said image reproduction device as a prescribed quality image; and     b) displaying an image representative of the effect of the processing of said digitized image by said image adjustment mechanism and generating a request for control information for controllably modifying the manner in which said image adjustment mechanism processes said digitized image, and wherein said step comprises displaying a plurality of images representative of the effects of different processing of said digitized image by modified versions of said image adjustment mechanism and generating a request for a selection of one of said displayed images, in response to which said image adjustment mechanism is controllably adjusted to process said image as an acceptable quality output image for reproduction.

25. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

a) processing said digitized image in accordance with an image adjustment failure discriminator to define the likelihood of whether or not said image adjustment failure discriminator will cause said modified output image to be reproduced by said image reproduction device as a prescribed quality image; and     b) displaying an image representative of the effect of the processing of said digitized image by said image adjustment mechanism and generating a request for control information for controllably modifying the manner in which said image adjustment mechanism processes said digitized image, and wherein said step comprises displaying a plurality of images representative of the effects of different processing of said digitized image by modified versions of said image adjustment mechanism and generating a request for a selection of one of said displayed images, in response to which said image adjustment mechanism is controllably adjusted to process said image as an acceptable quality output image for reproduction.

26. For use with an image processing system, in which a color photographic image that has been captured on a color photographic image recording medium is digitally encoded by an opto-electronic device and stored in a digital data base as a digitized image, said digitized image being processed by means of an image adjustment mechanism to derive a modified output image to be coupled to an image reproduction device, a method of controlling the operation of said system to reduce the effects of failures in the processing of a digitized image by said image adjustment mechanism comprising the steps of:

a) processing said digitized image in accordance with an image adjustment failure discriminator to define the likelihood of whether or not said image adjustment failure discriminator will cause said modified output image to be reproduced by said image reproduction device as a prescribed quality image; and     b) displaying an image representative of the effect of the processing of said digitized image by said image adjustment mechanism and generating a request for control information for controllably modifying the manner in which said image adjustment mechanism processes said digitized image, and wherein said step comprises displaying an image representative of the effect of processing said digitized image by said image adjustment mechanism and generating a request for the inputting of information representative of a characteristic of said image, in response to which said image adjustment mechanism is controllably adjusted to process said image as an acceptable quality output image for reproduction.

\* \* \* \* \*